United States Patent
Zheng et al.

(10) Patent No.: US 9,080,516 B2
(45) Date of Patent: Jul. 14, 2015

(54) DIAGNOSTIC SYSTEM AND METHOD FOR A VARIABLE VALVE LIFT MECHANISM

(75) Inventors: Liyun Zheng, Troy, MI (US); Andrew P. Bagnasco, Plymouth, MI (US); Gregory J. York, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 967 days.

(21) Appl. No.: 13/237,441

(22) Filed: Sep. 20, 2011

(65) Prior Publication Data

US 2013/0073178 A1   Mar. 21, 2013

(51) Int. Cl.
*F02D 13/02* (2006.01)
*F02D 28/00* (2006.01)
*F01L 1/344* (2006.01)

(52) U.S. Cl.
CPC ............... *F02D 13/02* (2013.01); *F01L 1/3442* (2013.01); *F01L 2800/11* (2013.01); *F01L 2820/04* (2013.01); *Y02T 10/18* (2013.01)

(58) Field of Classification Search
CPC .......... F02D 2200/024; F02D 13/0253; F02D 2041/001; F02D 41/221
USPC ............ 701/105, 111, 114; 123/90.15–90.17, 123/90.31, 456–458, 508, 509
See application file for complete search history.

(56) References Cited

U.S. PATENT DOCUMENTS

| | | | |
|---|---|---|---|
| 5,537,961 A | 7/1996 | Shigeru et al. | |
| 5,937,806 A | 8/1999 | Lyko et al. | |
| 6,196,174 B1 | 3/2001 | Wada et al. | |
| 6,691,653 B2 | 2/2004 | Denz | |
| 6,814,052 B2 | 11/2004 | Weiss et al. | |
| 6,885,976 B2 | 4/2005 | Yoshiki et al. | |
| 6,973,901 B2 | 12/2005 | Machida | |
| 7,063,057 B1 | 6/2006 | Waters et al. | |
| 7,077,082 B2 | 7/2006 | Bloms et al. | |
| 7,228,828 B2 | 6/2007 | Kagy et al. | |
| 7,246,583 B2 | 7/2007 | Cinpinski et al. | |
| 7,343,887 B2 | 3/2008 | Soejima | |
| 7,698,935 B2 | 4/2010 | Dibble et al. | |
| 7,770,562 B2 | 8/2010 | Pursifull et al. | |
| 7,783,413 B2 | 8/2010 | Cinpinski et al. | |
| 7,921,701 B2 | 4/2011 | Cinpinski et al. | |
| 8,056,516 B2 | 11/2011 | Cinpinski et al. | |
| 8,380,423 B2 | 2/2013 | Cowgill et al. | |
| 8,612,124 B2 * | 12/2013 | Verdejo et al. | 701/114 |
| 2003/0213445 A1 | 11/2003 | Bloms et al. | |
| 2005/0204805 A1 | 9/2005 | Wakahara et al. | |

(Continued)

OTHER PUBLICATIONS

U.S. Appl. Ser. No. 12/584,675, filed Aug. 27, 2010, Cowgill et al.

(Continued)

*Primary Examiner* — Hieu T Vo
*Assistant Examiner* — Arnold Castro

(57) ABSTRACT

A system according to the principles of the present disclosure includes a timing control module and a diagnostic module. The timing control module controls engine valve timing by sending fluid to an advancing chamber of a cam phaser to adjust the cam phaser to an advanced position and by sending fluid to a retarding chamber of the cam phaser to adjust the cam phaser to a retarded position. The diagnostic module identifies a fault in a variable valve lift (VVL) mechanism based on a first difference between an advancing pressure of the advancing chamber and a retarding pressure of the retarding chamber.

20 Claims, 5 Drawing Sheets

(56) References Cited

U.S. PATENT DOCUMENTS

| | | |
|---|---|---|
| 2006/0096581 A1* | 5/2006 | Pauli et al. .................... 701/114 |
| 2007/0068474 A1 | 3/2007 | Cinpinski et al. |
| 2007/0101959 A1 | 5/2007 | Soejima |
| 2008/0077307 A1 | 3/2008 | Wiles |
| 2008/0281453 A1 | 11/2008 | Kortge |
| 2009/0048729 A1 | 2/2009 | Waters et al. |
| 2009/0132146 A1 | 5/2009 | Dibble et al. |
| 2009/0143963 A1 | 6/2009 | Hendriksma |
| 2009/0222196 A1 | 9/2009 | Cinpinski et al. |
| 2009/0312937 A1 | 12/2009 | Pfeiffer |
| 2010/0024789 A1 | 2/2010 | Lippa et al. |
| 2010/0042306 A1 | 2/2010 | Gauthier et al. |
| 2010/0263438 A1* | 10/2010 | Bagnasco et al. .......... 73/114.26 |
| 2010/0269575 A1* | 10/2010 | Cinpinski et al. .......... 73/114.41 |
| 2011/0054766 A1 | 3/2011 | Cowgill et al. |
| 2011/0153181 A1* | 6/2011 | Bagnasco et al. ............. 701/109 |
| 2011/0196567 A1* | 8/2011 | Wiles et al. ................... 701/110 |
| 2013/0073178 A1 | 3/2013 | Zheng et al. |

OTHER PUBLICATIONS

U.S. Appl. Ser. No. 14/564,462, filed Dec. 9, 2014, Fiorini et al.

\* cited by examiner

DIAGNOSTIC SYSTEM AND METHOD FOR A VARIABLE VALVE LIFT MECHANISM

FIELD

The present disclosure relates to variable valve lift mechanisms, and more particularly, to diagnostic systems and methods for variable valve lift mechanisms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into cylinders of the engine. The air is mixed with fuel to form a combustion mixture. The combustion mixture is compressed within the cylinders and is combusted to drive pistons within the cylinders. An exhaust valve is selectively opened to allow exhaust gas to exit the cylinders after combustion.

A rotating cam shaft regulates the opening and closing of the intake and exhaust valves. The camshaft includes a plurality of cam lobes that rotate with the camshaft. The profile of the cam lobe determines a valve lift schedule. The valve lift schedule includes the amount of time that the valve is open (duration) and the magnitude or degree at which the valve opens (lift).

Variable valve actuation (VVA) technology improves fuel economy, engine efficiency, and/or performance by modifying a valve lift event, timing, and duration as a function of engine operating conditions. Two-step VVA systems include variable valve lift mechanisms such as hydraulically controlled switchable roller finger followers (SRFFs). SRFFs enable two discrete valve states (e.g., a low lift state and a high lift state) for the intake and/or exhaust valves.

SUMMARY

A system according to the principles of the present disclosure includes a timing control module and a diagnostic module. The timing control module controls engine valve timing by sending fluid to an advancing chamber of a cam phaser to adjust the cam phaser to an advanced position and by sending fluid to a retarding chamber of the cam phaser to adjust the cam phaser to a retarded position. The diagnostic module identifies a fault in a variable valve lift (VVL) mechanism based on a first difference between an advancing pressure of the advancing chamber and a retarding pressure of the retarding chamber.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
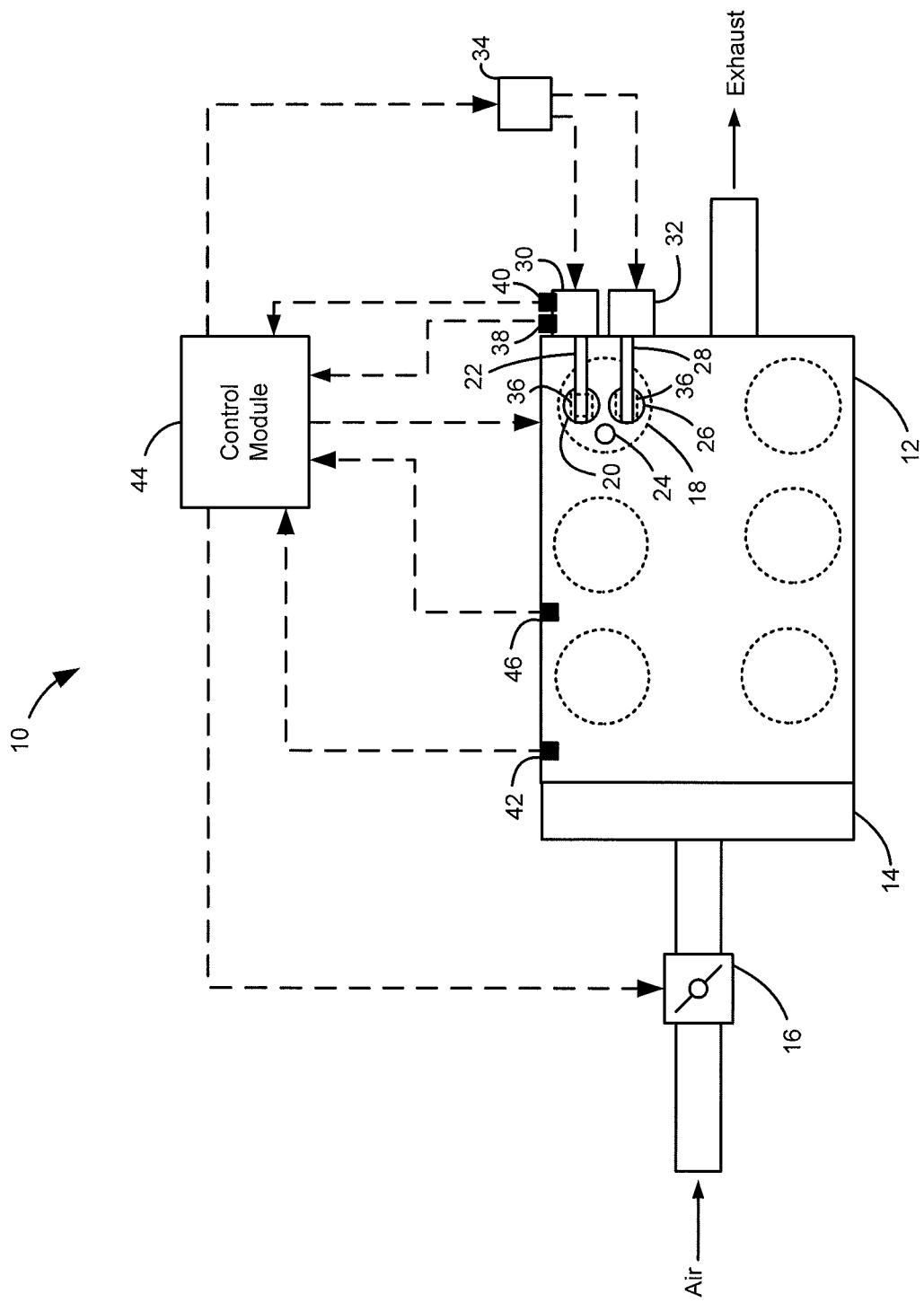
FIG. 1 is a functional block diagram of an example vehicle including a diagnostic system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A cam phaser includes a rotor that is fluidly coupled to a stator through an advancing chamber and a retarding chamber. Typically, the stator is coupled to a crankshaft using a timing chain and the rotor is bolted to a camshaft. The relative pressures of the advancing and retarding chambers may be adjusted to adjust the orientation of the rotor relative to the stator, and thereby advance or retard valve timing.

As the timing chain rotates the camshaft, a lobe on the camshaft engages a variable valve lift mechanism, such as a switchable roller finger follower (SRFF). In turn, the variable valve lift mechanism lifts an intake or exhaust valve to open an intake or exhaust passageway into a cylinder. The variable valve lift mechanism is switchable between two discrete valve states (e.g., a low lift state and a high lift state).

A diagnostic system and method according to the present disclosure identifies faults in the variable valve lift mechanism based on a pressure difference between the advancing and retarding chambers. The pressure difference indicates the amount of torque transferred through the variable valve mechanism (i.e., the valvetrain torque). The amount of torque transferred through the variable valve lift mechanism, and therefore the pressure difference, is greater when the variable valve lift mechanism is in the high lift state than when the variable valve lift mechanism is in the low lift state.

A first average pressure difference between the advancing and retarding chambers may be determined when the variable valve lift mechanism is switched to a first lift state. A second average pressure difference between the advancing and retarding chambers may be determined when the variable valve lift mechanism is switched to a second lift state. A switching fault in the variable valve lift mechanism may be identified when a difference between the first average pressure difference and the second average pressure difference is less than a predetermined pressure.

Identifying faults in the variable valve lift mechanism based on the pressure difference between the advancing and retarding chambers eliminates diagnostic errors caused by pressure fluctuations that affect both chambers in the same manner. These pressure fluctuations may be caused by variations in the pressure of fluid (e.g., oil) supplied to the advancing and retarding chambers. These pressure fluctuations may be caused by leakage from the advancing and retarding chambers.

Additionally, identifying faults in the variable valve lift mechanism based on the pressure difference between the advancing and retarding chambers eliminates diagnostic errors caused by the location of the pressure sensor(s). For example, identifying faults based only on output from a pressure sensor at the advancing chamber and identifying faults in the variable valve lift mechanism based only on output from a pressure sensor at the retarding chamber may yield different results.

Referring to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into one or more cylinders 18. Although the engine 12 is depicted as a 6-cylinder engine, the engine 12 can include more or less of the cylinders 18. Additionally, for simplicity, components associated with only one of the cylinders 18 (i.e., the cylinder 18) are discussed below, although similar or identical components may be associated with each of the cylinders 18 and/or groups of the cylinders 18.

A fuel injector (not shown) injects fuel that is combined with the air as it is drawn into the cylinder 18 through an intake port. The fuel injector may be an injector associated with an electronic or mechanical fuel injection system, a jet or port of a carburetor or another system for mixing fuel with intake air. The fuel injector is controlled to provide a desired air-to-fuel (A/F) ratio within the cylinder 18.

An intake valve 20 selectively opens and closes to enable the air/fuel mixture to enter the cylinder 18. The intake valve position is regulated by an intake camshaft 22. A piston (not shown) compresses the air/fuel mixture within the cylinder 18. A spark plug 24 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 26 is in an open position. The exhaust valve position is regulated by an exhaust camshaft 28. The exhaust is treated in an exhaust system. Although single intake and exhaust valves 20, 26 are illustrated, it can be appreciated that the engine 12 can include multiple intake and exhaust valves 20, 26 for each of the cylinders 18.

The engine system 10 may include an intake cam phaser 30 and an exhaust cam phaser 32 that respectively regulate the rotational timing of the intake and exhaust camshafts 22, 28. More specifically, the timing or phase angle of the intake and exhaust camshafts 22, 28 can be retarded or advanced with respect to each other, with respect to the location of the piston within the cylinder 18, and/or with respect to crankshaft position.

In this manner, the position of the intake and exhaust valves 20, 26 can be regulated with respect to each other, with respect to the location of the piston within the cylinder 18, and/or with respect to crankshaft position. By regulating the position of the intake and exhaust valves 20, 26, the quantity of air/fuel mixture ingested into the cylinder 18, and therefore the engine torque, is regulated. The cam phasers 30, 32 are hydraulically actuated using an electrically-controlled fluid (e.g., oil) control valve (OCV) 34. The OCV 34 controls fluid flow into and out of the cam phasers 30, 32.

Additionally, low lift cam lobes and high lift cam lobes are mounted to each of the intake and exhaust camshafts 22, 28, as discussed below with reference to FIG. 2. The low lift cam lobes and high lift cam lobes rotate with the intake and exhaust camshafts 22, 28 and are in operative contact with variable valve lift mechanisms such as switching roller finger follower (SRFF) mechanisms 36. One of the SRFF mechanisms 36 may operate on each of the intake and exhaust valves 20, 26. Thus, two of the SRFF mechanisms 36 may be associated with each of the cylinders 18. For simplicity, only the intake cam phaser 30 and one of the SRFF mechanisms 36 (i.e., the SRFF mechanism 36) are discussed below, although the exhaust cam phaser 32 and the remainder of the SRFF mechanisms 36 may be similar or identical.

The SRFF mechanism 36 provides two levels of valve lift for the intake valve 20. The two levels of valve lift include low lift and high lift and are based on the low lift cam lobes and high lift cam lobes, respectively. During "normal" operation (i.e., low lift operation or a low lift state), a low lift cam lobe causes the SRFF mechanism 36 to pivot to a first position and thereby open the intake valve 20 by a first amount. During high lift operation (i.e., a high lift state), a high lift cam lobe causes the SRFF mechanism 36 to pivot to a second position and thereby opening the intake valve 20 by a second amount that is greater than the first amount.

A position sensor 38 senses a position of the cam phaser 30 and generates a cam phaser position signal indicating the position of the cam phaser 30. A pressure sensor 40 generates a cam phaser pressure signal indicating the pressure of the cam phaser 30, as discussed in more detail below with reference to FIG. 3. An engine speed sensor 42 is responsive to a rotational speed of the engine 12 and generates an engine speed signal in, for example, revolutions per minute (RPM).

A control module 44 controls the engine 12 based on input received from the position sensor 38, the pressure sensor 40, and the engine speed sensor 42. The control module 44 may receive input from other sensors 46 including, but not limited to, oxygen sensors, engine coolant temperature sensors, and/or mass airflow sensors.

The control module 44 identifies faults in the SRFF mechanisms 36 based on the input received from the pressure sensor 40. The control module 44 may identify which one of the cylinders 18 is associated with a faulty one of the SRFF mechanisms 36 and command a remedial action (e.g., limiting engine speed) in order to prevent damage to the engine 12.

Figure 2:
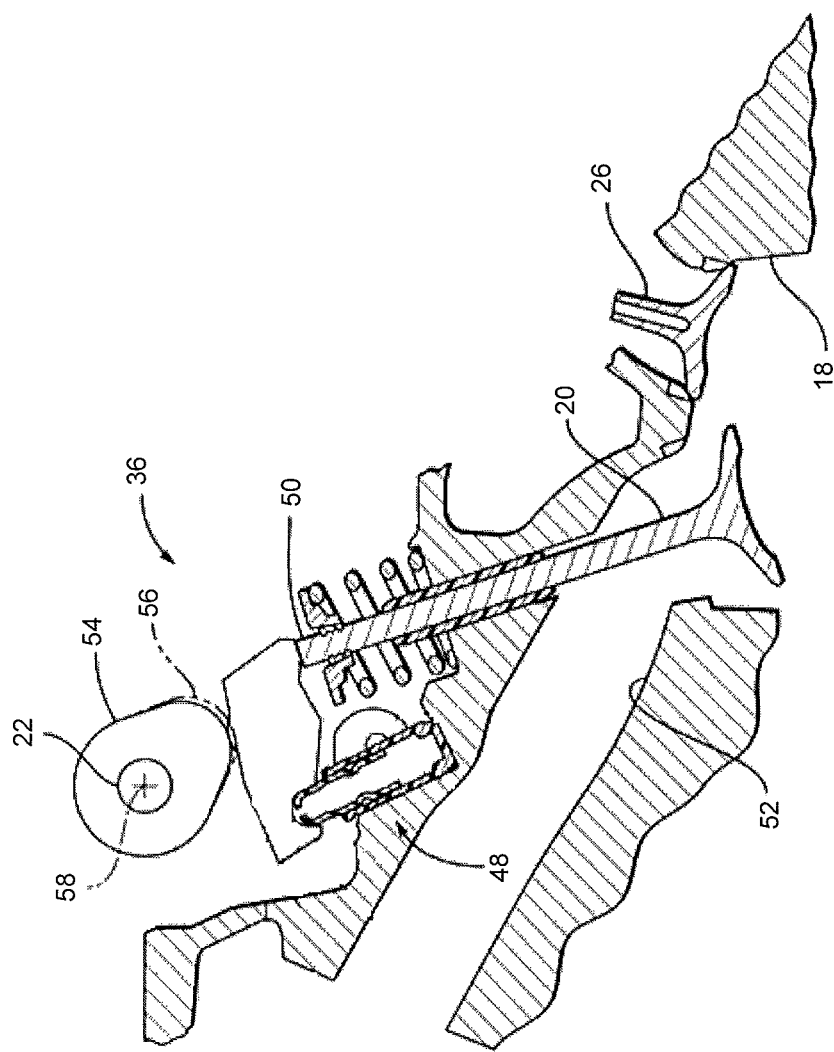
FIG. 2 is a sectional view of an example hydraulic lift mechanism according to the present disclosure.

Referring to FIG. 2, the SRFF mechanism 36 is shown in more detail. The SRFF mechanism 36 is pivotally mounted on a hydraulic lash adjuster 48 and contacts a valve stem 50 of the intake valve 20, which selectively opens and closes an inlet passage 52 to the cylinder 18. The intake valve 20 is selectively lifted and lowered in response to rotation of the intake camshaft 22 on which multiple cam lobes (e.g. a low lift cam lobe 54 and a high lift cam lobe 56) are mounted. The intake camshaft 22 rotates about an intake camshaft axis 58. Although the example embodiment describes the SRFF mechanism 36 operating on the intake valve 20, the SRFF mechanism 36 may operate similarly on the exhaust valve 26.

The control module 44 shown in FIG. 1 transitions the SRFF mechanism 36 from a low lift state to a high lift state and vice versa based on demanded engine speed and load. For example, the control module 44 may transition the SRFF mechanism 36 to the high lift state when engine speed is at an elevated speed (e.g., 4,000 RPM) in order to avoid potential hardware damage to the engine 12.

Figure 3:
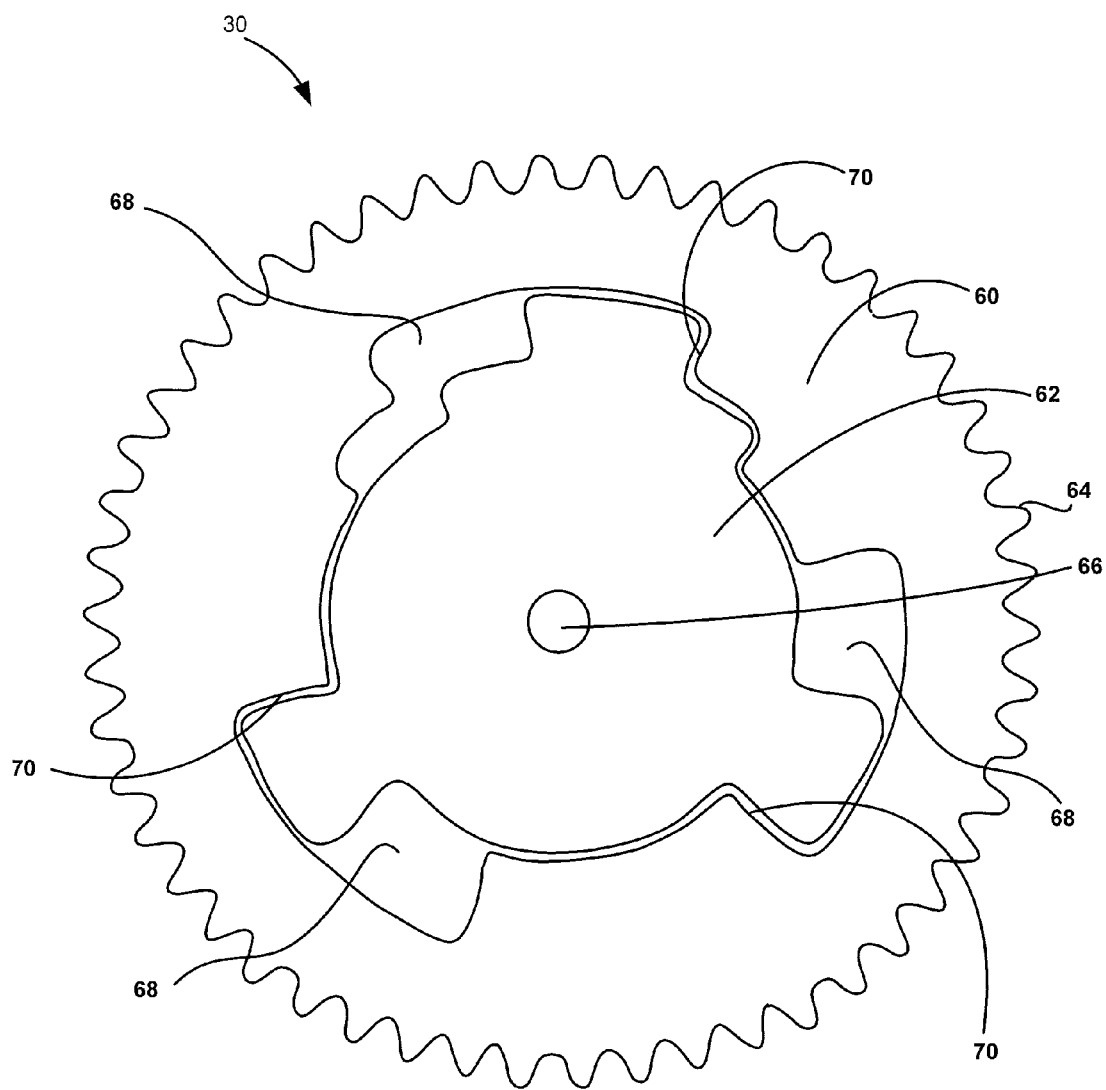
FIG. 3 is a sectional view of an example cam phaser according to the present disclosure.

Referring to FIG. 3, the cam phaser 30 is shown in more detail. The cam phaser 30 includes a stator 60 and a rotor 62. The stator 60 is coupled to the crankshaft of the engine 12 using, for example, a timing belt or chain (not shown) meshed with teeth 64 disposed around the perimeter of the stator 60. The rotor 62 is mechanically coupled to the camshaft 22 using, for example, a bolt 66 extending through the camshaft 22 and the rotor 62.

The rotor 62 is fluidly coupled to the stator 60 through, for example, an advancing chamber 68 and a retarding chamber 70. The labels associated with the chambers 68, 70 assume that the cam phaser 30 is shown in an advanced position. However, the position of the cam phaser 30 shown may be in a retarded position, in which case the labels associated with the chambers 68, 70 may be reversed.

The control module 44 controls the OCV 34 to adjust the position of the rotor 62 relative to the stator 60 by adjusting the relative pressures of the advancing and retarding chambers 68, 70. The OCV 34 adjusts the relative pressures of the advancing and retarding chambers 68, 70 by adjusting the amount and pressure of fluid supplied to the advancing and retarding chambers 68, 70, respectively. The cam phaser 30 is adjusted to the advanced position when the pressure of the advancing chamber 68 is greater than the pressure of the retarding chamber 70, rotating the rotor 62 clockwise to the position shown. The cam phaser 30 is adjusted to the retarded position when the pressure of the advancing chamber 68 is less than the pressure of the retarding chamber 70, rotating the rotor 62 counterclockwise from the position shown.

The control module 44 identifies faults in the SRFF mechanisms 36 based on a difference between the pressure of the advancing chamber 68 and the pressure of the retarding chamber 70. The pressure sensor 40 may include a pressure sensor disposed in, or at the outlet of, the advancing chamber 68 and a pressure sensor disposed in, or at the outlet of, the retarding chamber 70. Alternatively, the pressure sensor 40 may be a differential pressure sensor that is in fluid communication with (e.g., the outlets of) the advancing and retarding chambers 68, 70. In either case, the control module 44 may determine the difference between the pressures of the advancing and retarding chambers 68, 70 based on input from the pressure sensor 40.

Figure 4:
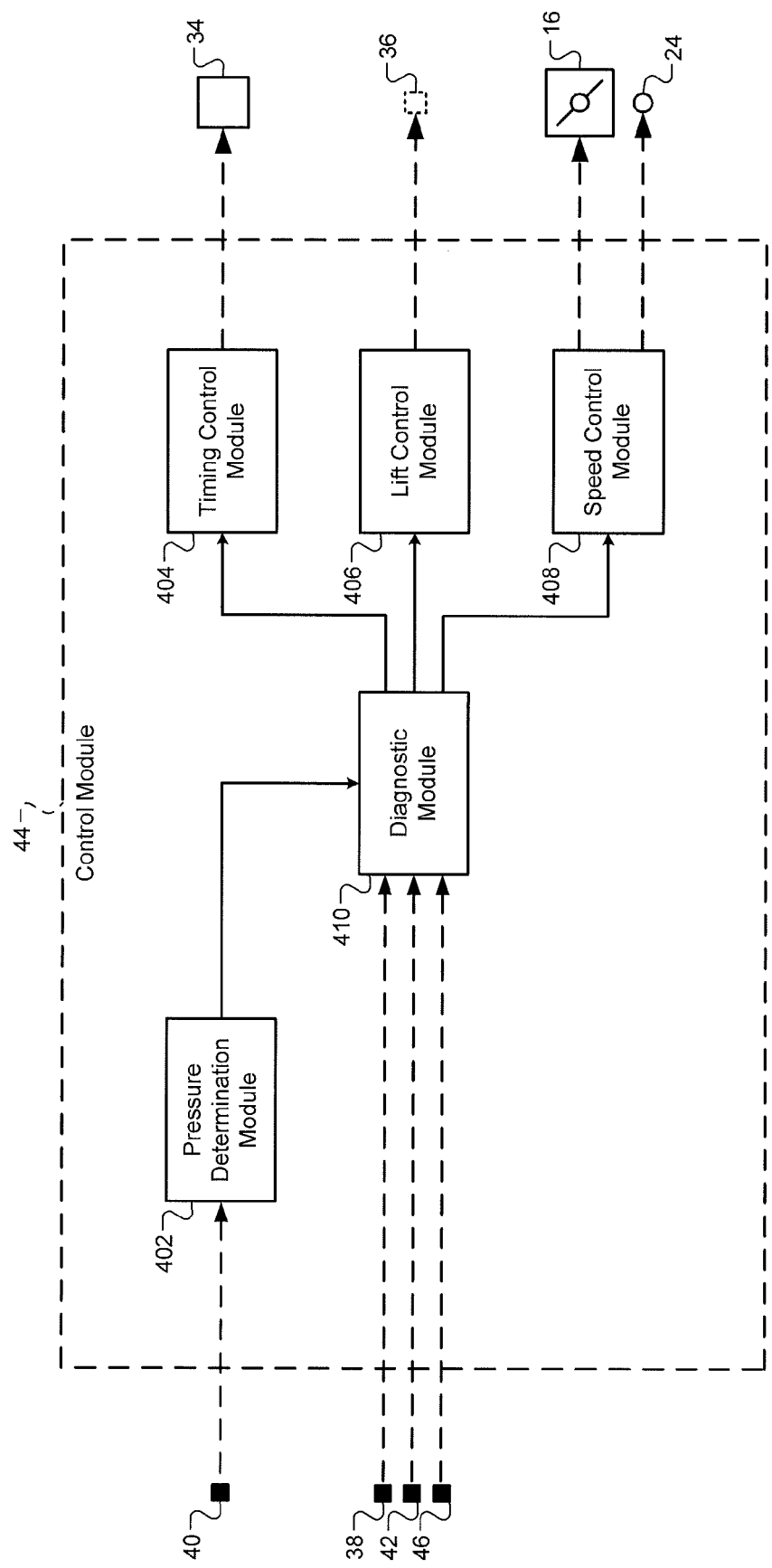
FIG. 4 is a functional block diagram of an example diagnostic system for a variable valve lift mechanism according to the present disclosure.

Referring to FIG. 4, the control module 44 includes a pressure determination module 402, a timing control module 404, a lift control module 406, a speed control module 408, and a diagnostic module 410. For simplicity, the following describes the control module 44 in the context of components associated with the intake valve 20. However, operation of the control module 44 on components associated with the exhaust valve 26 may be similar or identical.

The pressure determination module 402 determines an advancing chamber pressure and a retarding chamber pressure based on input received from the pressure sensor 40. The pressure determination module 402 may determine the difference between the advancing and retarding chamber pressures. The pressure determination module 402 may determine this pressure difference for each valve lift event, when a camshaft lobe engages the SRFF mechanism 36, causing a pulse in the chamber pressures (e.g., twice per engine cylinder per engine cycle).

The timing control module 404 controls valve timing by adjusting the position of the cam phaser 30. The timing control module 404 adjusts the cam phaser 30 to the advanced and retarded positions by controlling the OCV 34 to adjust the advancing and retarding chamber pressures. The timing control module 404 adjusts the cam phaser 30 to the advanced position by increasing the advancing chamber pressure relative to the retarding chamber pressure. The timing control module 404 adjusts the cam phaser 30 to the retarded position by increasing the retarding chamber pressure relative to the advancing chamber pressure.

The lift control module 406 controls valve lift by switching the SRFF mechanism 36 between two distinct lift states (e.g., a high lift state and a low lift state). The lift control module 406 may switch the SRFF mechanism 36 to the low lift state when the engine speed is less than a predetermined speed (e.g., 2,000 RPM). The lift control module 406 may switch the SRFF mechanism 36 to the low lift state when the engine speed is greater than or equal to the predetermined speed. The speed control module 408 controls the engine speed by adjusting the position of the throttle valve 16, the timing of the spark plug 24, and/or the pulse width of the fuel injector.

The diagnostic module 410 identifies faults in the SRFF mechanism 36 based on a difference between the advancing and retarding chamber pressures. The diagnostic module 410 may receive the advancing and retarding chamber pressures, and/or the difference between the advancing and retarding chamber pressures, from the pressure determination module 402. Alternatively, the diagnostic module 410 may receive the advancing and retarding chamber pressures, and/or the difference between the advancing and retarding chamber pressures, directly from the pressure sensor 40.

The diagnostic module 410 may communicate with the position sensor 38, the engine speed sensor 42, and the other sensors 46. The diagnostic module 410 may determine whether various enablement conditions are met before executing a diagnostic method to identify faults in the SRFF mechanism 36. The enablement conditions may be met when the engine speed is less than a predetermined speed (e.g., 2,000 RPM) and the cam phaser 30 remains in a steady-state operating position. In other words, the enablement conditions may be met when the engine 12 is operating in a "normal" or low lift state.

The diagnostic module 410 may command the lift control module 406 to switch the SRFF mechanism 36 to the low lift state if the SRFF mechanism 36 is not in the low lift state when the enablement conditions are met. The pressure determination module 402 may determine a first average difference between the advancing and retarding pressures over a first predetermined number of engine revolutions (e.g., 8) when the SRFF mechanism 36 is in the low lift state. The pressure determination module 402 outputs the first average difference.

The diagnostic module 410 may command the lift control module 406 to switch the SRFF mechanism 36 to a high lift state when the first average difference is determined. The pressure determination module 402 may determine a second average difference between the advancing and retarding pressures over a second predetermined number of engine revolutions when the SRFF mechanism 36 is in the low lift state. The first and second predetermined numbers may be equal or different. The pressure determination module 402 outputs the second average difference.

The pressure determination module 402 may refrain from determining the second average difference for a waiting period when the SRFF mechanism 36 is initially switched to the high lift state. The waiting period may be predetermined to allow the SRFF mechanism 36 to transition from the low lift state to the high lift state before the second average difference is determined. For example, the waiting period may correspond to 4 engine revolutions.

The diagnostic module 410 may identify a switching fault in the SRFF mechanism 36 when the difference between the first average difference and the second average difference is less than a predetermined pressure (e.g., 2.5 pounds per square). The diagnostic module 410 identifies a switching fault in the SRFF mechanism 36 when the SRFF mechanism 36 fails to switch valve lift states as commanded. Although the foregoing discusses switching the SRFF mechanism 36 from the low lift state to the high lift state, faults in the SRFF mechanism 36 may be identified in a similar manner by switching the SRFF mechanism 36 from the high lift state to the low lift state.

The diagnostic module 410 may command a remedial action when a switching fault in the SRFF mechanism 36 is identified. For example, the diagnostic module 410 may command the speed control module 408 to limit the engine speed to a predetermined speed (e.g., 2,000 RPM).

Figure 5:
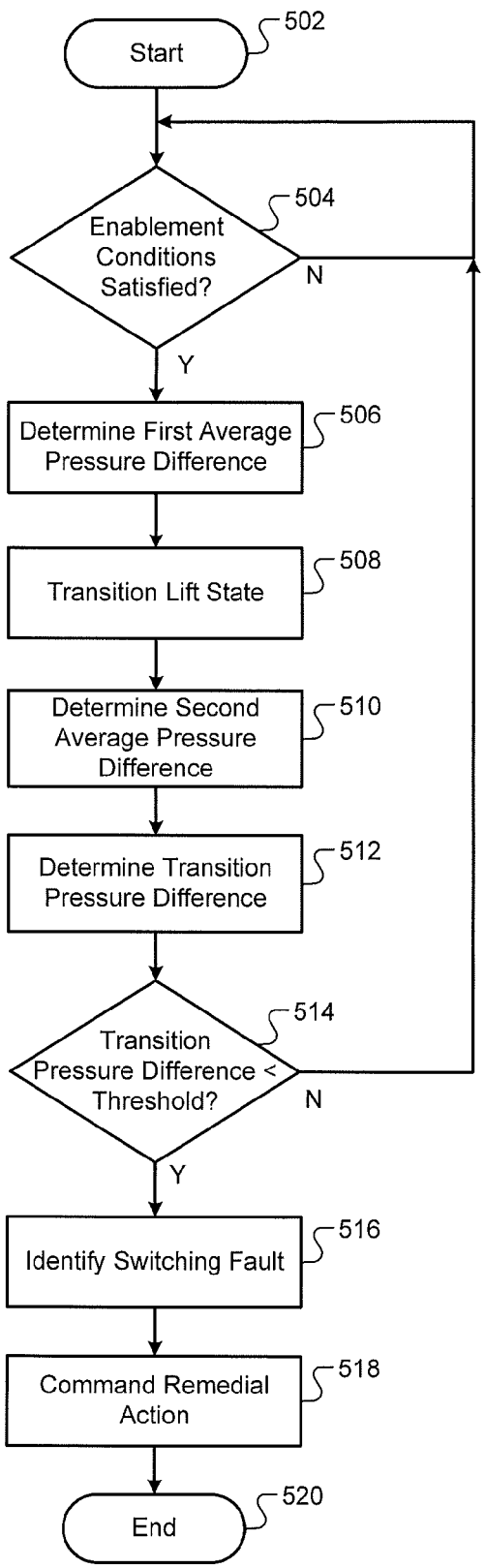
FIG. 5 is a flowchart illustrating an example diagnostic method for a variable valve lift mechanism according to the present disclosure.

Referring to FIG. 5, a method for identifying faults in the SRFF mechanism 36 is illustrated. The method begins at 502. At 504, the method determines whether the enablement conditions have been satisfied. If the enablement conditions have been satisfied, the method continues at 506.

At 506, the method determines a first average difference between advancing and retarding chamber pressures corresponding to each valve lift event. As discussed above, a SRFF mechanism may be associated with each intake and exhaust valve in each cylinder of an engine. Thus, there may be two valve lift events for each cylinder.

At 508, the method commands the SRFF mechanism to transition from a first lift state (e.g. the low lift state) to a second lift state (e.g. the high lift state). At 510, the method determines a second average difference between advancing and retarding chamber pressures corresponding to each valve lift event. At 512, the method determines the difference between the first average difference and the second average difference (i.e., a transition pressure difference) corresponding to each valve lift event.

At 514, the method determines whether the transition pressure difference corresponding to at least one of the valve lift events is less than a pressure threshold. If the transition pressure difference for each of valve lift events is greater than or equal to the pressure threshold, the method determines that no SRFF mechanism failure exists and returns to 504. If the transition pressure difference for at least one of the valve lift events is greater than the pressure threshold, the method continues at 516.

At 516, the method generates a signal identifying the cylinder associated with the SRFF mechanism failure. At 518, the method commands a remedial action (e.g., limiting engine speed) in order to prevent engine damage. The method ends at 520.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system, comprising:
a timing control module that controls engine valve timing by sending fluid to an advancing chamber of a cam phaser to adjust the cam phaser to an advanced position and by sending fluid to a retarding chamber of the cam phaser to adjust the cam phaser to a retarded position; and
a diagnostic module that identifies a fault in a variable valve lift (VVL) mechanism based on a first difference between an advancing pressure of the advancing chamber and a retarding pressure of the retarding chamber.

2. The system of claim 1, wherein the diagnostic module determines the first difference based on input received from a differential pressure sensor that is in fluid communication with the advancing chamber and the retarding chamber.

3. The system of claim 1, wherein the diagnostic module determines the first difference based on input received from a first pressure sensor disposed at the advancing chamber and a second pressure sensor disposed at the retarding chamber.

4. The system of claim 1, further comprising a lift control module that switches the VVL mechanism between a first lift state and a second lift state, wherein the diagnostic module identifies the fault in the VVL mechanism based on a second difference between: i) the first difference when the VVL mechanism is switched to the first lift state; and ii) the first difference when the VVL mechanism is switched to the second lift state.

5. The system of claim 4, wherein the diagnostic module identifies the fault in the VVL mechanism when the second difference is less than a predetermined pressure.

6. The system of claim 4, further comprising a pressure determination module that determines a first average difference between the advancing pressure and the retarding pressure over a first predetermined number of engine revolutions when the VVL mechanism is switched to the first lift state.

7. The system of claim 6, wherein the pressure determination module determines a second average difference between the advancing pressure and the retarding pressure over a second predetermined number of engine revolutions when the VVL mechanism is switched to the second lift state.

8. The system of claim 7, wherein the diagnostic module identifies the fault in the VVL mechanism based on the first average difference and the second average difference.

9. The system of claim 8, wherein the diagnostic module identifies the fault in the VVL mechanism based on a third difference between the first average difference and the second average difference.

10. The system of claim 9, wherein the diagnostic module identifies the fault in the VVL mechanism when the third difference is less than a predetermined pressure.

11. A method, comprising:
controlling engine valve timing by sending fluid to an advancing chamber of a cam phaser to adjust the cam phaser to an advanced position and by sending fluid to a retarding chamber of the cam phaser to adjust the cam phaser to a retarded position; and
identifying a fault in a variable valve lift (VVL) mechanism based on a first difference between an advancing pressure of the advancing chamber and a retarding pressure of the retarding chamber.

12. The method of claim 11, further comprising determining the first difference based on input received from a differential pressure sensor that is in fluid communication with the advancing chamber and the retarding chamber.

13. The method of claim 11, further comprising determining the first difference based on input received from a first pressure sensor disposed at the advancing chamber and a second pressure sensor disposed at the retarding chamber.

14. The method of claim 11, further comprising switching the VVL mechanism between a first lift state and a second lift state and identifying the fault in the VVL mechanism based on a second difference between: i) the first difference when the VVL mechanism is switched to the first lift state; and ii) the first difference when the VVL mechanism is switched to the second lift state.

15. The method of claim 14, further comprising identifying the fault in the VVL mechanism when the second difference is less than a predetermined pressure.

16. The method of claim 14, further comprising determining a first average difference between the advancing pressure and the retarding pressure over a first predetermined number of engine revolutions when the VVL mechanism is switched to the first lift state.

17. The method of claim 16, further comprising determining a second average difference between the advancing pressure and the retarding pressure over a second predetermined number of engine revolutions when the VVL mechanism is switched to the second lift state.

18. The method of claim 17, further comprising identifying the fault in the VVL mechanism based on the first average difference and the second average difference.

19. The method of claim 18, further comprising identifying the fault in the VVL mechanism based on a third difference between the first average difference and the second average difference.

20. The method of claim 19, further comprising identifying the fault in the VVL mechanism when the third difference is less than a predetermined pressure.

* * * * *